United States Patent
Beamon et al.

(10) Patent No.: US 6,771,739 B1
(45) Date of Patent: Aug. 3, 2004

(54) PRESSURE ALARMS AND REPORTS SYSTEM MODULE FOR PROACTIVE MAINTENANCE APPLICATION

(75) Inventors: Elizabeth Ann Beamon, Kannapolis, NC (US); Ronnie L. Rozier, Lithonia, GA (US); Philip B. Ashcraft, Cumming, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/727,066

(22) Filed: Nov. 30, 2000

Related U.S. Application Data

(60) Provisional application No. 60/212,207, filed on Jun. 16, 2000.

(51) Int. Cl.[7] .................................................. H04M 1/24
(52) U.S. Cl. ..................... 379/9.03; 379/9.02; 379/9.04; 379/29.09; 379/29.08; 379/29.1
(58) Field of Search ............................... 379/9.02, 9.03, 379/9.04, 9.01, 29.01, 27.01, 27.03, 27.04, 29.05, 29.08, 29.09, 29.1, 32.01, 10.01, 22.03, 26.01; 359/10

(56) References Cited

U.S. PATENT DOCUMENTS

| | | | |
|---|---|---|---|
| 4,972,453 A | | 11/1990 | Daniel, III et al. |
| 5,521,958 A | | 5/1996 | Selig et al. |
| 5,692,144 A | | 11/1997 | Thrush |
| 5,710,648 A | * | 1/1998 | Frigo |
| 5,790,633 A | | 8/1998 | Kinser, Jr. et al. |
| 5,790,634 A | | 8/1998 | Kinser, Jr. et al. |
| 5,933,816 A | | 8/1999 | Zeanah et al. |
| 5,937,168 A | | 8/1999 | Anderson et al. |
| 5,953,389 A | * | 9/1999 | Pruett et al. .................... 379/9 |
| 5,970,477 A | | 10/1999 | Roden |
| 6,018,576 A | | 1/2000 | Croslin |
| 6,026,145 A | | 2/2000 | Bauer et al. |
| 6,032,121 A | | 2/2000 | Dietrich et al. |
| 6,208,776 B1 | * | 3/2001 | Prohaska et al. |
| 6,295,540 B1 | * | 9/2001 | Sanschagrin et al. ....... 707/201 |
| 6,353,902 B1 | * | 3/2002 | Kulatunge et al. ............ 714/12 |
| 6,445,774 B1 | * | 9/2002 | Kidder et al. .............. 379/9.03 |
| 6,493,694 B1 | | 12/2002 | Xu et al. |
| 6,529,877 B1 | * | 3/2003 | Murphy et al. ................. 705/7 |
| 6,614,882 B1 | | 9/2003 | Beamon et al. |

FOREIGN PATENT DOCUMENTS

| | | |
|---|---|---|
| EP | 0 650 302 | 4/1995 |
| WO | 98 24222 | 6/1998 |

* cited by examiner

*Primary Examiner*—Rexford Barnie
(74) *Attorney, Agent, or Firm*—Cantor Colburn LLP

(57) ABSTRACT

Methods and systems for proactively maintaining a telephone system local loop. One embodiment includes communicating with a communications network and acquiring information associated with pressure or flow sensors along fiber optic cables. Proactive maintenance of the fiber optic cables is predicted using the information associated with pressure or flow sensors. The embodiment may further include generating and dispatching work order information describing the predicted proactive maintenance. The embodiment may also include predicting proactive maintenance of telephone lines using information from a Dynamic Network Analyzer and using information from a Loop Facilities and Control System. Another embodiment includes a system for predicting proactive maintenance of a telephone system local loop. This embodiment includes a Pressure Alarms and Reports System Module, a database stored in memory, and a processor. The Pressure Alarms and Reports System Module communicates with a communications network and acquires at least one of i) pressure information associated with fiber optic cables and ii) flow information associated with fiber optic cables. The database stores the acquired information. The processor processes information stored in the database and generates predicted proactive maintenance.

13 Claims, 13 Drawing Sheets

PRESSURE ALARMS AND REPORTS SYSTEM MODULE FOR PROACTIVE MAINTENANCE APPLICATION

CROSS-REFERENCE TO RELATED APPLICATIONS

This application claims the benefit of U.S. Provisional Application No. 60/212,207, filed Jun. 16, 2000.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to methods for predicting proactive maintenance and, more particularly, to methods and systems for predicting proactive maintenance of the Public Switched Telephone Network.

2. Description of the Related Art

Residential and business telephone customers are connected to telephone systems by copper cables, copper wires, and even fiber optic cables. The copper cables and wires, for example, are the familiar one or more telephone lines running throughout nearly every home in the United States. Fiber optic cables are increasingly used to carry voice and data between metropolitan areas and between business locations. Because copper cable, copper wire, and even fiber optic cable connects nearly all homes and businesses to the telephone system, the Public Switched Telephone Network is a massive network composed of billions of copper cables, copper wires, and fiber optic cables. These cables and wires must be maintained to provide superior telephone service to the customer.

Copper cable and wire, however, are known to deteriorate and to degrade service. Copper cable and wire suffers from exposure to ozone, summer heat, winter cold, and water. Copper cables and wires are often strung from telephone poles, buried underground, and installed within the walls and floors of buildings. This environmental exposure is acute in older buildings and neighborhoods where the telephone lines were installed twenty-five (25) to fifty (50) years ago. Copper cables and wires, in fact, are known to deteriorate at approximately twelve percent (12%) to fifteen percent (15%) per year. The public telephone system, with its billions of copper telephone lines, requires a structured, proactive maintenance plan to ensure telephone customers receive the highest quality telephone service available in the market.

Fiber optic cable must also be maintained. Although the fiber optic cables are often routed within a protective conduit, this conduit may crack with seasonal freezing and thawing. These cracks allow water to seep into the conduit, and water affects the transmissibility of light along the fiber optic cable. Older fiber optic cable may have higher attenuation or even cable breaks. Even something as small as a kink in the fiber may cause unacceptably high optical losses. Thus, the public telephone system's increasing use of fiber optic cables requires a structured, proactive maintenance plan to ensure the highest quality telephone service.

Telephone service providers, however, are challenged when monitoring and tracking proactive maintenance procedures. Currently proactive maintenance is assigned, dispatched, and tracked in a manual environment. Management relies upon individual experience to determine when, and where, proactive maintenance is performed. Management recommends proactive maintenance, and management's recommendation funnels down to supervisors. Supervisors manually write work orders describing the proactive maintenance procedures. These work orders are then assigned to field technicians. The field technician performs the proactive maintenance and then informs the supervisor. The supervisor completes a ticket describing the completed work order, and the ticket funnels back up to management. This manual process is slower than desired, and management would prefer a rapid response to customer requests.

Individual experience and style also influence proactive maintenance efforts. Some managers strongly believe in proactive maintenance. Other managers are less familiar with proactive maintenance. Telephone customers, as a result, often have differing experiences in quality and service. Some managers know immediately what copper cables and wires are operational and ready for customer use. Other managers have a backlog of repairs and require more time to learn what lines are functioning. This varied management style reduces the ability of telephone companies to execute a unified, customer service plan.

The manual environment also does not adequately prioritize proactive maintenance. A manager may often have a backlog of proactive maintenance work order. This backlog may be assigned without a focus on the core importance of customer service. A technician, for example, may be assigned to paint a graffiti-covered crossconnect box, even though some customers are without telephone service. The manual environment too easily allows technician efforts to be mistakenly assigned to lower-priority repair work.

The manual environment also hampers bulk repair efforts. Because the manual environment does not collect and track repair work, managers and technicians have little knowledge of other repair efforts. One technician may be dispatched to a location to repair a single copper cable, and the next day another technician may be dispatched to the same location to repair another copper cable. A single technician, however, could have repaired both copper cables in a single assignment. Bulk repair is especially important when we remember there may be thousands of copper cables branching from the crossconnect boxes. The manual environment hinders managers from assigning and tracking bulk copper cable repairs to avoid unnecessary labor costs.

The manual environment also inadequately measures technician proficiency. Although some technicians can repair many copper cables in a few hours, other technicians may not be as efficient and may require more time. The manual environment simply counts the number of work orders a technician completed. The manual environment cannot monitor what really matters to internal customers; that is, the actual number of copper cables repaired by the technician. The manual environment, then, cannot monitor technician efficiency and cannot objectively measure technician performance. The manual environment fails to objectively reward technicians for their actual efforts.

There is, accordingly, a need in the art for methods and systems for predicting proactive maintenance of the Public Switched Telephone Network. These methods and systems will preferably monitor and track proactive maintenance procedures, reduce the influence of erratic management styles and beliefs, prioritize and assign bulk proactive maintenance procedures, and objectively measure technician proficiency.

BRIEF SUMMARY OF THE INVENTION

The aforementioned problems are reduced by a Proactive Maintenance Application. The Proactive Maintenance Application comprises a system that may be implemented in a computer program. The Proactive Maintenance Application acquires information representing many different departments, disciplines, and operations. The Proactive Maintenance Application, for example, may acquire one, or more, of the following types of information: engineering information, customer information, maintenance information, service information, and even real-time process information. The Proactive Maintenance Application acquires information and then combines the information to predict and to prioritize proactive maintenance procedures. Once the Proactive Maintenance Application predicts and prioritizes the proactive maintenance procedures, the Proactive Maintenance Application may even have another feature that creates and dispatches work orders. These work orders describe the proactive maintenance procedures that should be performed. Still another optional feature assigns the work orders to a particular technician. The technician receives the work orders and performs the predicted proactive maintenance procedures.

The Proactive Maintenance Application may be utilized for one or more functions. The Proactive Maintenance Application may monitor proactive maintenance, may assign proactive maintenance, and may track proactive maintenance. Because the Proactive Maintenance Application collects information from various departments and operations, one advantage is that the Proactive Maintenance Application provides a centralized database for proactive maintenance. The Proactive Maintenance Application may also be used to monitor the condition of equipment and facilities and predict what proactive maintenance should be performed. The Proactive Maintenance Application may also generate work orders describing the predicted proactive maintenance and then track the progress and completion of the work order. The Proactive Maintenance Application may even automatically update the centralized database so that management has a complete, accurate view of equipment and facilities.

The Proactive Maintenance Application may also be utilized to assign proactive maintenance in bulk. Bulk repairs reduce labor costs and improve revenue. Because the Proactive Maintenance Application monitors information from many departments, the Proactive Maintenance Application can assign a single technician to perform many overlapping repairs. The Proactive Maintenance Application can even identify what specialized skills and equipment will be needed to complete a repair and, once identified, assign those technicians that have the needed skills and equipment. The Proactive Maintenance Application may thus advantageously reduce labor costs by reducing redundant technician dispatches. Bulk repairs also quickly provide more facilities for more customers and, thus, more revenue for the company.

It should be understood that the foregoing description of the Proactive Maintenance Application system is intended to provide an overview of the many separate inventions encompassed therein. Each of the separate inventive features of the Proactive Maintenance Application system is described in more detail below.

BRIEF DESCRIPTION OF THE SEVERAL VIEWS OF THE DRAWINGS

These and other features, aspects, and advantages of the mobile re-radiating antenna are better understood when the following Detailed Description of the Invention is read with reference to the accompanying drawings, wherein.

DETAILED DESCRIPTION OF THE INVENTION

Figure 1:
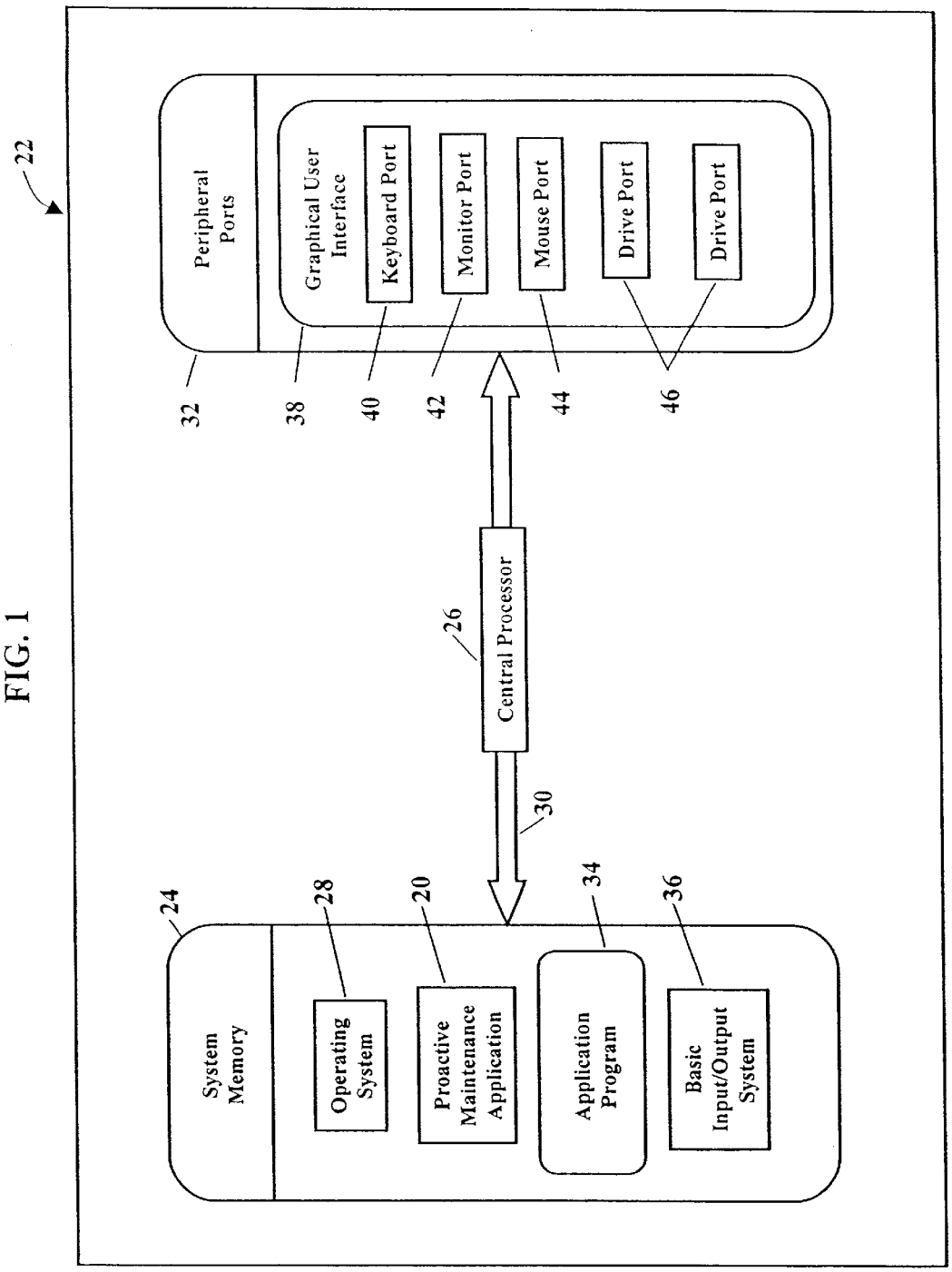
FIG. 1 is a block diagram showing the Proactive Maintenance Application residing in a computer system.

The present invention particularly relates to methods and systems for proactively maintaining a telephone system local loop. One embodiment comprises communicating with a communications network and acquiring at least one of i) pressure information associated with fiber optic cables and ii) flow information associated with fiber optic cables. Proactive maintenance of the fiber optic cables is predicted using the acquired information. The embodiment may further comprise generating and dispatching work order information describing the predicted proactive maintenance. The embodiment may further comprise predicting proactive maintenance of telephone lines using information from a Dynamic Network Analyzer and/or information from a Loop Facilities and Control System. The embodiment may also comprise generating and dispatching work order information describing the predicted proactive maintenance of the fiber optic cables and the predicted proactive maintenance of the telephone lines.

Another embodiment comprises a system configured for predicting proactive maintenance of a telephone system local loop. The system comprises: a Pressure Alarms and Reports System Module communicating with a communications network and acquiring at least one of i) pressure information associated with fiber optic cables and ii) flow information associated with fiber optic cables; a database stored in memory, the database storing the acquired information; and a processor capable of processing information stored in the database and of generating predicted proactive maintenance. The system may also comprise a Dynamic Network Analyzer module, the Dynamic Network Analyzer module communicating with the communications network and acquiring information associated with a Dynamic Network Analyzer. The system may further comprise a Loop Facilities and Control System module, the Loop Facilities and Control System module communicating with the communications network and acquiring information associated with a Loop Facilities and Control System.

Still another embodiment describes a computer program product for proactively maintaining a telephone system. This computer program product comprises a computer-readable medium, and a Pressure Alarms and Reports System module stored on the medium. The Pressure Alarms and Reports System module couples to a monitoring system over a communications network. The Pressure Alarms and Reports System module acquires at least one of i) information associated with pressure sensors along fiber optic cables and ii) information associated with flow sensors along fiber optic cables. This computer program product may also comprise a Dynamic Network Analyzer module stored on the medium. The Dynamic Network Analyzer module couples to a Dynamic Network Analyzer over a communications network. The Dynamic Network Analyzer module acquires information associated with the Dynamic Network Analyzer. This computer program product may also comprise a Loop Facilities and Control System module stored on the medium. The Loop Facilities and Control System module couples to a Loop Facilities and Control System over a communications network. The Loop Facilities and Control System module acquires information associated with the Loop Facilities and Control System.

"Proactive maintenance" predicts what maintenance procedures should be performed to avoid later, catastrophic equipment failures. The objective is to predict and perform equipment maintenance before the equipment actually begins to fail. The systems and methods described herein can be utilized to acquire information representing many different departments, disciplines, and operations. All this information may then be used to predict the early stages of equipment failure. The systems and methods thus allow engineers and field technicians to correct early-stage failures before the normal progression of failure starts. The systems and methods of the present invention may advantageously be used to determine the need for equipment repair, or for equipment replacement, in time to avoid more catastrophic equipment failures.

Figure 2:
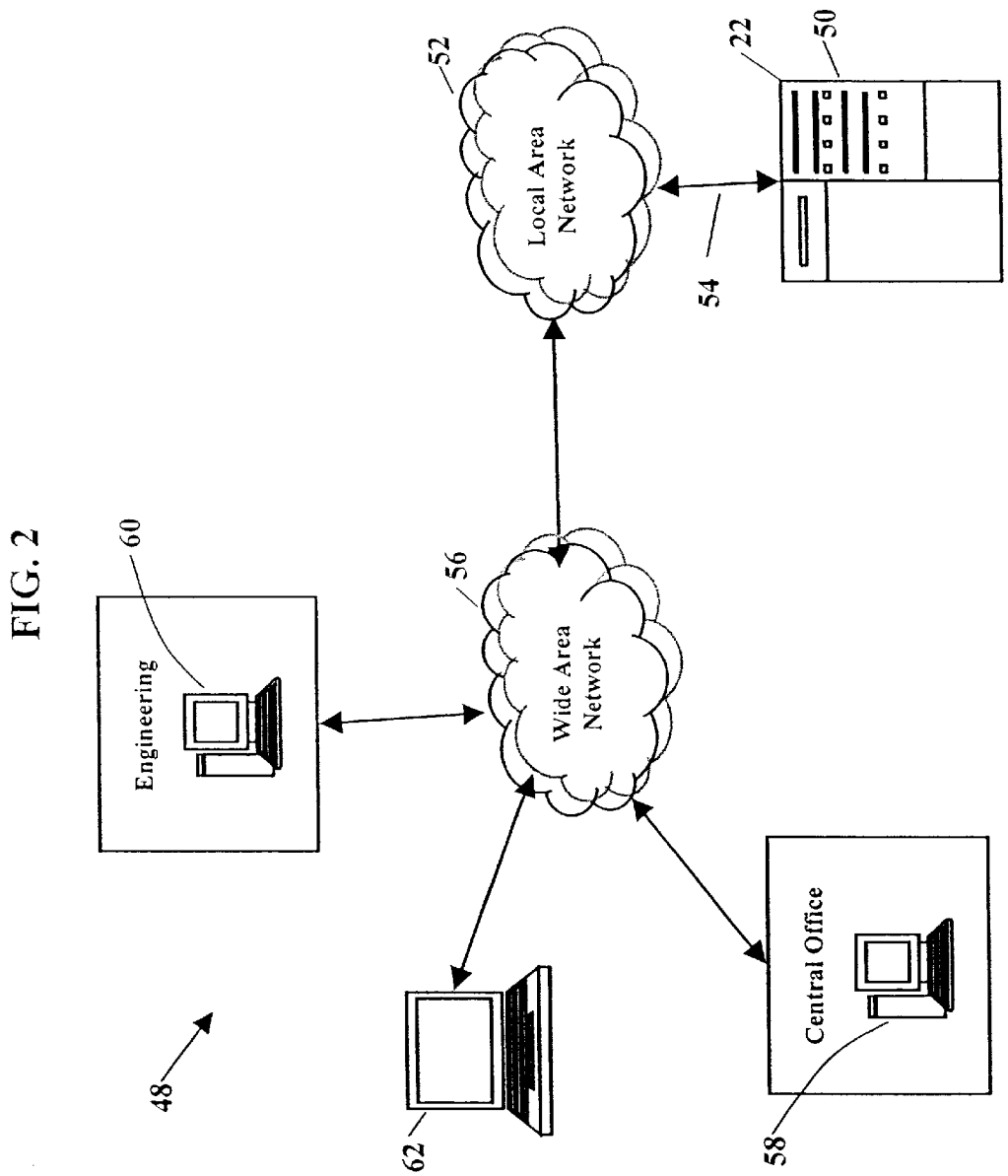
FIG. 2 is a block diagram of a communication network representing the operating environment for the Proactive Maintenance Application.

FIGS. 1 and 2 depict a possible operating environment for an embodiment of the present invention in computer software. This embodiment of a Proactive Maintenance Application 20 comprises a computer program that acquires information and predicts proactive maintenance. As those skilled in the art of computer programming recognize, computer programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Proactive Maintenance Application 20 residing in a computer system 22. The Proactive Maintenance Application 20 may be stored within a system memory device 24. The computer system 22 also has a central processor 26 executing an operating system 28. The operating system 28 also resides within the system memory device 24. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. While the computer system 22 is a Hewlett Packard 9000, those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other microprocessor manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). While only one microprocessor is shown, those of ordinary skill in the art also recognize multiple processors may be utilized. Those of ordinary skill in the art further understand that the program, processes, methods, and systems described in this patent are not limited to any particular manufacturer's central processor.

The system memory 24 also contains an application program 34 and a Basic Input/Output System (BIOS) program 36. The application program 34 cooperates with the operating system 28 and with the at least one peripheral port 32 to provide a Graphical User Interface (GUI) 38. The Graphical User Interface 38 is typically a combination of signals communicated along a keyboard port 40, a monitor port 42, a mouse port 44, and one or more drive ports 46. The Basic Input/Output System 36, as is well known in the art, interprets requests from the operating system 28. The Basic Input/Output System 36 then interfaces with the keyboard port 40, the monitor port 42, the mouse port 44, and the drive ports 46 to execute the request.

The operating system 28 is WINDOWS NT® (WINDOWS NT® is a registered trademark of Microsoft Corporation, One Microsoft Way, Redmond Wash. 98052-6399, 425.882.8080, www.Microsoft.com). WINDOWS NT® is preinstalled in the system memory device 24 on the Hewlett Packard 500. Those skilled in the art also recognize many other operating systems are suitable, such as UNIX® (UNIX® is a registered trademark of the Open Source Group, www.opensource.org), Linux, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

FIG. 2 is a block diagram of a communications network 48. This communications network 48 further represents an operating environment for the Proactive Maintenance Application (shown as reference numeral 20 in FIG. 1). The Proactive Maintenance Application resides within the memory storage device (shown as reference numeral 24 in FIG. 1) in the computer system 22. The computer system 22 is conveniently shown as a computer server 50 representing the Hewlett Packard 500. The computer system 22 communicates with a Local Area Network (LAN) 52 along one or more data communication lines 54. As those skilled in the art have long understood, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56. The communications network 48 allows the Proactive Maintenance Application to request and acquire information from many computers connected to the Local Area Network 52 and the Wide Area Network 56. The communications network 48 may even communicate with a globally distributed computing network.

As FIG. 2 shows, the Proactive Maintenance Application requests and acquires information from many other computers connected to the communications network 48. The Proactive Maintenance Application, for example, acquires information from a switching computer 58 located within at a telephone system's central office. The Proactive Maintenance Application could also acquire information from an engineering computer 60 at an engineering facility. FIG. 2 even shows that remote users, such as field technicians, may use a portable computer 62 to dial into the communications network 48 and remotely access the Proactive Maintenance Application. Because many computers may be connected to the communications network 48, computers and computers users may share and communicate a vast amount of information.

Figure 3:
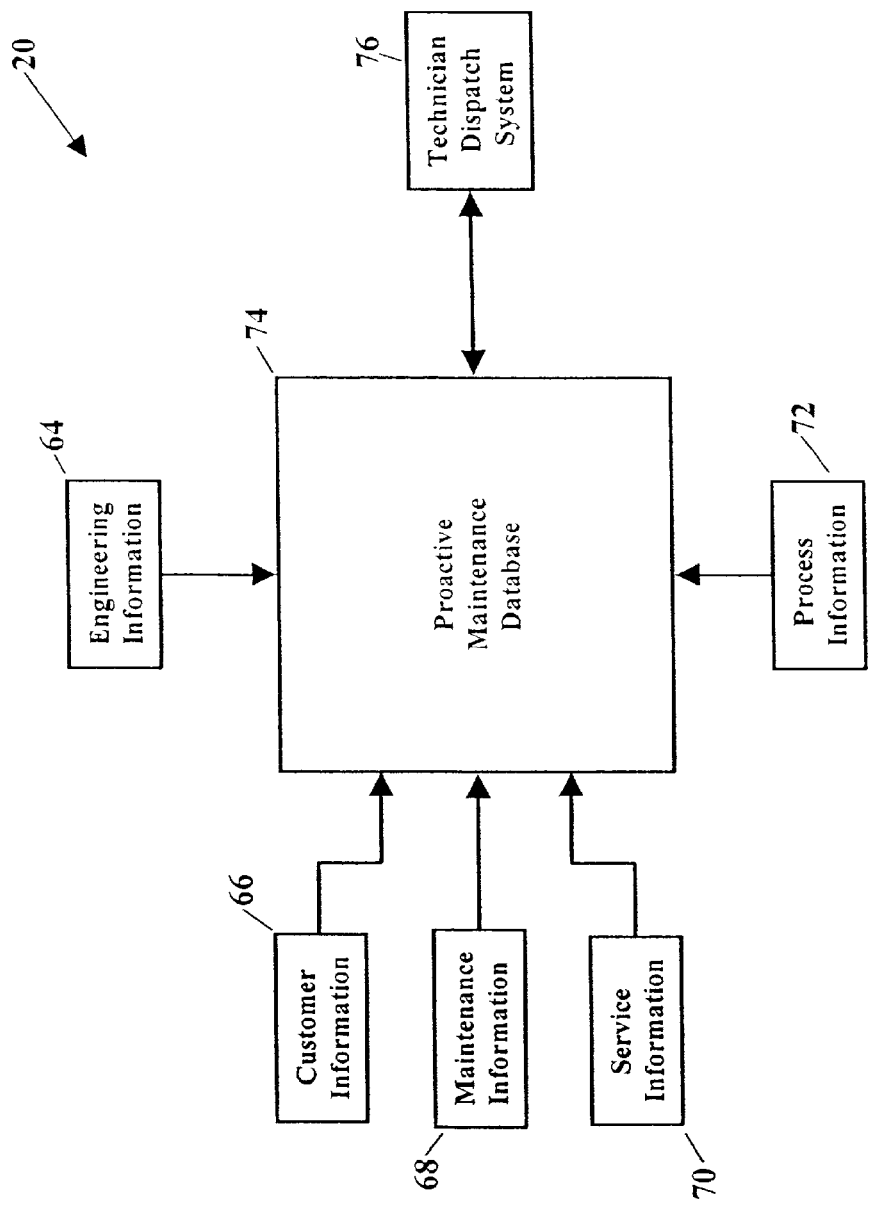
FIG. 3 is a block diagram showing one embodiment of the Proactive Maintenance Application.

FIG. 3 is a block diagram showing one embodiment of the Proactive Maintenance Application 20. The Proactive Maintenance Application 20 is a computer program platform that acquires information from the communications network (shown as reference numeral 48 in FIG. 2) and uses this information to predict proactive maintenance procedures. As FIG. 3 illustrates, the Proactive Maintenance Application 20 may acquire information representing many different departments, disciplines, and operations. The Proactive Maintenance Application 20, for example, may acquire one or more of the following information types: engineering information 64, customer information 66, maintenance information 68, service information 70, and even real-time process information 72. The Proactive Maintenance Application 20 acquires this information and stores this information in a Proactive Maintenance Application Database 74. The Proactive Maintenance Application 20 then combines the acquired information, for example, the engineering information 64, customer information 66, maintenance information 68, service information 70, and/or real-time process information 72, to predict and to prioritize proactive maintenance procedures. The Proactive Maintenance Application 20 may further assign weights to each source of information to increase or decrease the influence of either combined component.

The engineering information 64 may represent various engineering activities. The engineering information 64, for example, could represent component or system durability test results, model shop equipment errors, or CAD/CAM dimensions and/or tolerances. The engineering information 64 may also represent component or system performance data, material specifications, or even government regulations. Any engineering-type information that could be used to predict proactive maintenance is considered within the ambit of the engineering information 64.

The customer information 66 may represent various customer activities. The customer information 66, for example, may represent actual customer purchasing preferences, marketing data, or customer product or process improvement suggestions. The customer information 66 may also represent customer demographic data, customer order information, or even customer profiles. Any customer-type information that could be used to predict proactive maintenance is considered within the ambit of the customer information 66.

The maintenance information 68 may represent various maintenance activities. The maintenance information 68, for example, may represent component replacement history, system or process performance history, or equipment repair history. The maintenance information 68 may also represent process measurement data, statistical process control data, maintenance logs, and even technician data. Any maintenance-type information that could be used to predict proactive maintenance is considered within the ambit of the maintenance information 68.

The service information 70 may represent various service activities. The service information 70, for example, may represent warranty information, unique or special service tooling information, limitations encountered during service repairs, or obstacles encountered during service repairs. The service information 70 may also represent field conditions (e.g., temperature, humidity, dust, and dirt), availability of original equipment manufacture (OEM) service parts, or even failure data. Any service-type information that could be used to predict proactive maintenance is considered within the ambit of the service information 70.

The real-time process information 72 may represent various process activities. The real-time process information 72, for example, may represent equipment wear indicators, gauge data, or process data (e.g., mold temperature data, cleaning/washing fluid turbidity data, or machine speed data). The real-time process information 72 may also represent re-work information, shift production data, or even line shut-down indicators. Any process-type information that could be used to predict proactive maintenance is considered within the ambit of the real-time process information 72.

The Proactive Maintenance Application 20 may even dispatch work orders. Once the Proactive Maintenance Application 20 predicts and prioritizes the proactive maintenance procedures, the Proactive Maintenance Application 20 then interfaces with a technician dispatch system 76 to create and dispatch work orders. These work orders describe the proactive maintenance procedures that should be performed. The Proactive Maintenance Application 20 may even assign the work orders to a particular technician. The technician receives the work orders and performs the predicted proactive maintenance procedures.

Those of ordinary skill, and even unskilled, in the art recognize the Proactive Maintenance Application 20 is applicable to many different environments, industries, and processes. The Proactive Maintenance Application 20 is especially applicable to the Public Switched Telephone Network. The Public Switched Telephone Network (PSTN) is composed of many switches and thousands of copper cables, copper wires, and fiber optic cables. These copper and fiber optic cables are often buried underground, strung from telephone poles, and tucked within the walls of buildings. Because these cables may deteriorate at approximately twelve percent (12%) to fifteen percent (15%) per year, the local telephone carrier needs to proactively maintain the system to provide quality telephone service. If the system is not adequately maintained, customer complaints increase, quality suffers, and costs increase.

Another reason to implement the Proactive Maintenance Application is local telephone competition. Where local telephone service was once a monopoly, competition is now coming to the local arena. There will be a mix of copper cables, trunks, switches, and services provided by each local carrier. See ROBERT A. GABLE, TELECOMMUNICATIONS DEPARTMENT MANAGEMENT 232 (1999). Perhaps the most challenging aspect of this local competition is managing the local telephone system. See id Local telephone service providers must maintain a meticulously accurate database of their respective cables and switches. No telephone company can afford to repair and maintain another company's cables and switches. The Proactive Maintenance Application 20 could improve a local service provider's competitive position by mechanizing maintenance procedures.

Figure 4A:
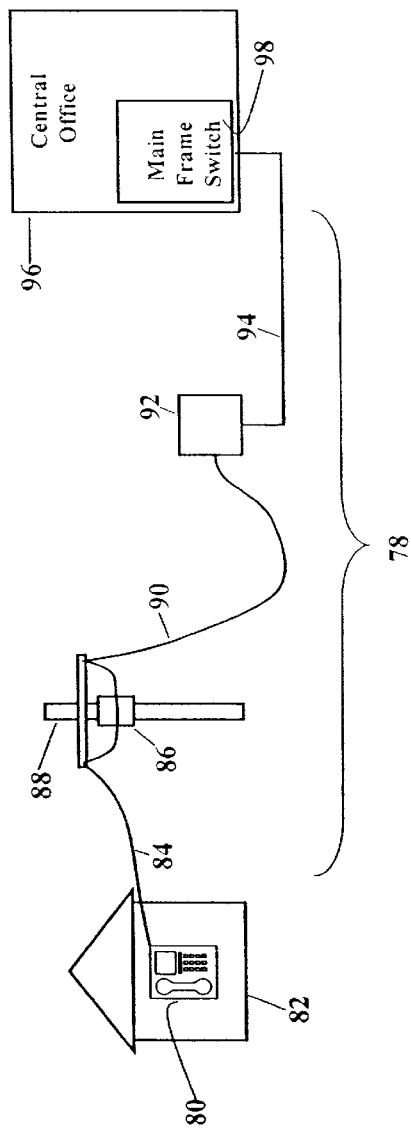
FIGS. 4A and 4B are diagrams illustrating a local loop of the Public Switched Telephone Network.
Figure 4B:
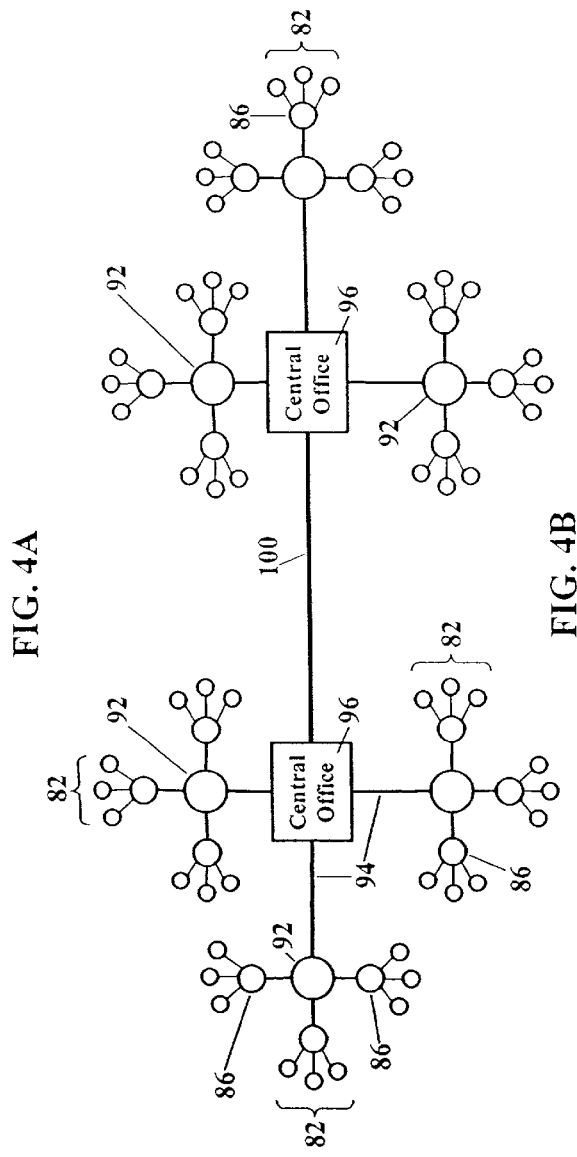

FIGS. 4A and 4B illustrate the need for proactive maintenance of the Public Switched Telephone Network. FIG. 4A is a diagram illustrating a local loop 78 of the Public Switched Telephone Network. The local loop 78 is the physical infrastructure that routes telephone calls between customers. A residential telephone customer, for example, places a call using terminal equipment 80 located inside a house 82. While FIG. 4A shows the terminal equipment 80 as a common telephone, the terminal equipment 80 could alternatively be a facsimile machine, personal computer modem, or other similar equipment. The terminal equipment 80 converts sound into electrical signals. The electrical signals travel along a copper line pair 84 to a small cross-connect 86. The small cross-connect 86 is shown located atop a utility pole 88, but the small cross-connect 86 could be located at ground level in newer installations. A distribution cable 90 carries the electrical signals from the small cross-connect 86 to a large cross-connect 92. A feeder cable 94 carries the electrical signals to a central office 96. Inside the central office is a main frame switch 98. The main frame switch 98 routes the electrical signals to the proper destination. See RICHARD A. THOMPSON, TELEPHONE SWITCHING SYSTEMS 71–72 (2000).

FIG. 4B shows the central office 96 may serve multiple local loops. While FIG. 4A shows only one (1) feeder cable 94, FIG. 4B shows that the central office 96 may serve multiple feeder cables. Each feeder cable 94 may carry thousands of copper line pairs to each respective large cross-connect 92. Each feeder cable 94, therefore, serves a different part of the community. Each large cross-connect 92, in turn, may serve as a distribution point for many small cross-connects 86. Each small cross-connect 86, in turn, serves many residential households 82. There may, in turn, be multiple central offices, with each central office 96 connected by a trunk line 100. See THOMPSON, supra, at 71. The complexity of the Public Switched Telephone Network is further magnified knowing there are approximately forty thousand (40,000) central offices located throughout the United States. See THOMPSON, supra, at 95. Such a complex system, with billions of copper line pairs and fiber optic cables, requires a meticulously detailed, logical, and simple maintenance system to ensure quality telephone service.

Figure 5:
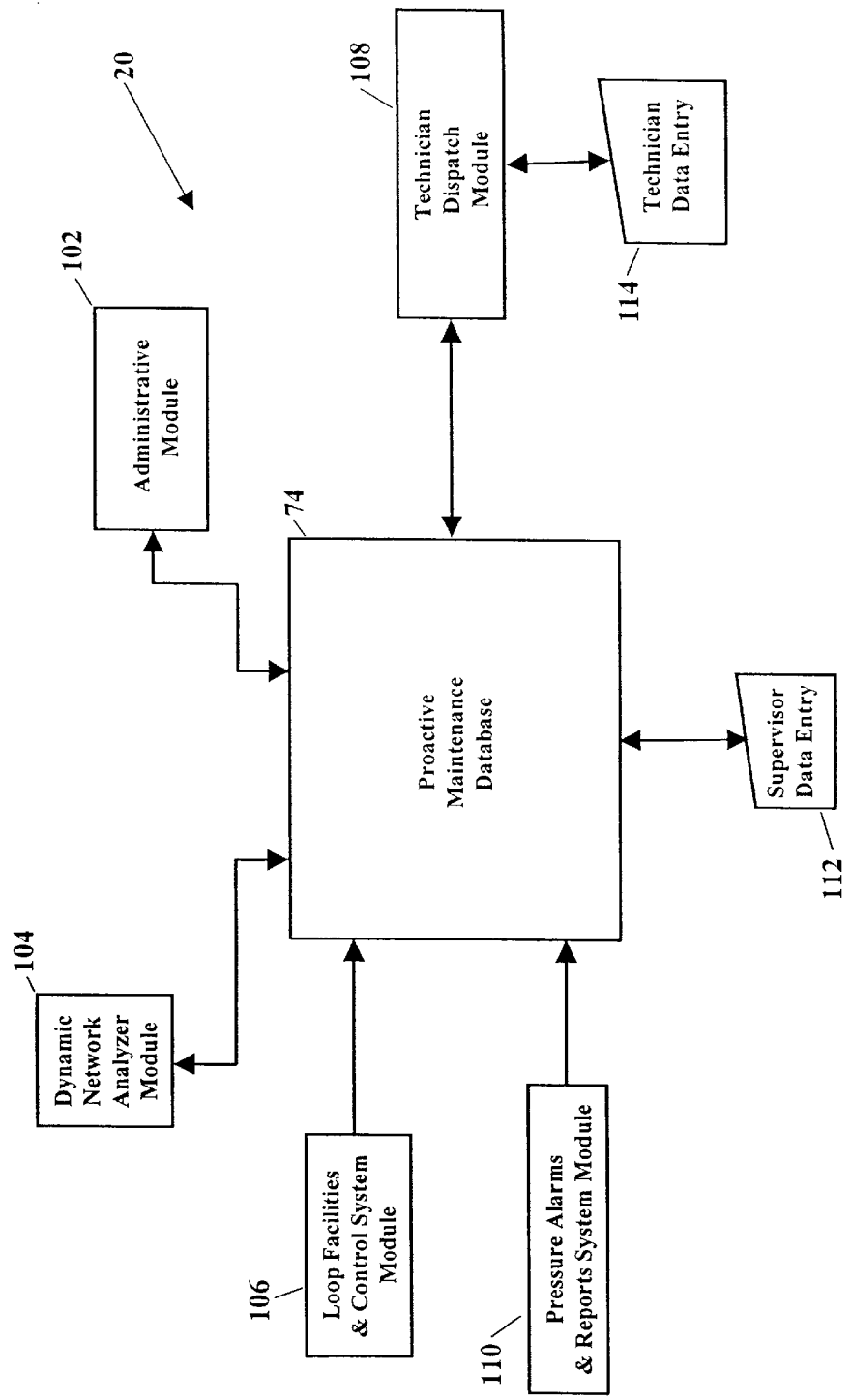
FIG. 5 is a block diagram showing an alternative embodiment of the Proactive Maintenance Application.

The Proactive Maintenance Application 20, therefore, is very useful for proactively maintaining the local loop of Public Switched Telephone Network. FIG. 5 is a block diagram showing an alternative embodiment of the Proactive Maintenance Application 20. This alternative embodiment is configured for proactively maintaining the local loop (shown as reference numeral 78 in FIG. 4A). The proactive Maintenance Application Database 74 interfaces with several data sources to predict any needed proactive maintenance. These data interfaces include an Administrative Module 102, a Dynamic Network Analyzer Module 104, a Loop Facilities and Control System Module 106, a Technician Dispatch Module 108, and a Air Pressure Alarms and Report System Module 110. A Loop Engineering Information System module may also be included as shown and as described in U.S. patent application Ser. No. 09/726,751, filed concurrently herewith, titled "Proactive Maintenance Application" and incorporated herein by reference in its entirety. The Proactive Maintenance Application Database 74, in addition, accepts manually-entered supervisor data 112 and manually-entered technician data 114. Each interface and data input provides information for predicting proactive maintenance procedures. The Proactive Maintenance Application Database 74 acquires and combines all this information. The Proactive Maintenance Application Database 74 predicts, based upon the combined information, what proactive maintenance procedures should be performed to maintain the local loop. The Proactive Maintenance Application Database 74 priorities these proactive maintenance procedures. The Proactive Maintenance Application Database then interfaces with the Technician Dispatch Module 108 to generate and to dispatch proactive maintenance work others. These proactive maintenance work orders are assigned to filed service technician, and the field service technicians perform the predicted proactive maintenance procedures.

The Proactive Maintenance Application 20 may also track the status of work orders. Not only does the Proactive Maintenance Application 20 prioritize work orders, but the Proactive Maintenance Application 20 also receives progress updates. Users of the Proactive Maintenance Application 20 can learn the date a work order was (or will be) dispatched, the name of any assigned field technician, and whether the field technician has completed the work order. The field technician may even update the Proactive Maintenance Application 20 with progress reports, estimated completion time and date, any needed equipment, or any required support. The Proactive Maintenance Application 20 thus provides a common repository or database of pending and assigned work orders for all users to access and use.

The Proactive Maintenance Application 20 may also provide historical work order information. Because the Proactive Maintenance Application 20 stores all generated work orders, the Proactive Maintenance Application 20 provides an easy and quick access to historical work order information. The Proactive Maintenance Application 20, for example, could be searched to learn how many times a particular crossconnect has been serviced, how frequently a particular customer's line has been repaired, or what areas are especially prone to repair. This historical information enables the Proactive Maintenance Application 20, and the users of Proactive Maintenance Application 20, to improve proactive maintenance and to thus improve telephone service.

The Proactive Maintenance Application 20 may be physically embodied on or in a computer-readable medium. This computer-readable medium includes CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the Proactive Maintenance Application to be easily disseminated.

A computer program product for proactively maintaining a telephone system may comprising the computer-readable medium and one or more modules. The Digital Loop Carrier module, the Dynamic Network Analyzer module, and the Loop Facilities and Control System module may be stored on the medium. The Digital Loop Carrier Module is coupled to a Digital Loop Carrier over a communications network, and the Digital Loop Carrier module acquires information concerning the Digital Loop Carrier. The Dynamic Network Analyzer module is coupled to a Dynamic Network Analyzer over the communications network, and the Dynamic Network Analyzer module acquires information concerning the Dynamic Network Analyzer. The Loop Facilities and Control System module is coupled to a Loop Facilities and Control System over the communications network, and the Loop Facilities and Control System module acquires information concerning the Loop Facilities and Control System.

The Administrative Module 102

The Administrative Module 102 provides system administration. A systems administrator uses the Administrative Module 102 to maintain and to manage the Proactive Maintenance Application 20. The systems administrator can use the Administrative Module 102 to establish and define many parameters that the Proactive Maintenance Application 20 requires. The Administrative Module 102, for example, defines the users of the Proactive Maintenance Application 20, their passwords, and what privileges each user will have. The Administrative Module 102 may also be used to define security levels for accessing the Proactive Maintenance Application 20. One level of security, for example, may be established for those users accessing the Proactive Maintenance Application 20 from outside a network firewall. Another level of security could be established for those users accessing from within the network firewall. The Administrative Module 102 may also be used to add or remove printer destinations or even edit printer information. Field supervisors may also use the Administrative Module 102 to identify field service technicians who will be assigned proactive maintenance work orders. The Administrative Module 102, in short, manages the Proactive Maintenance Application 20 and pre-populates any administrative data required by other interfaces.

The Dynamic Network Analyzer Module 104

Figure 6:
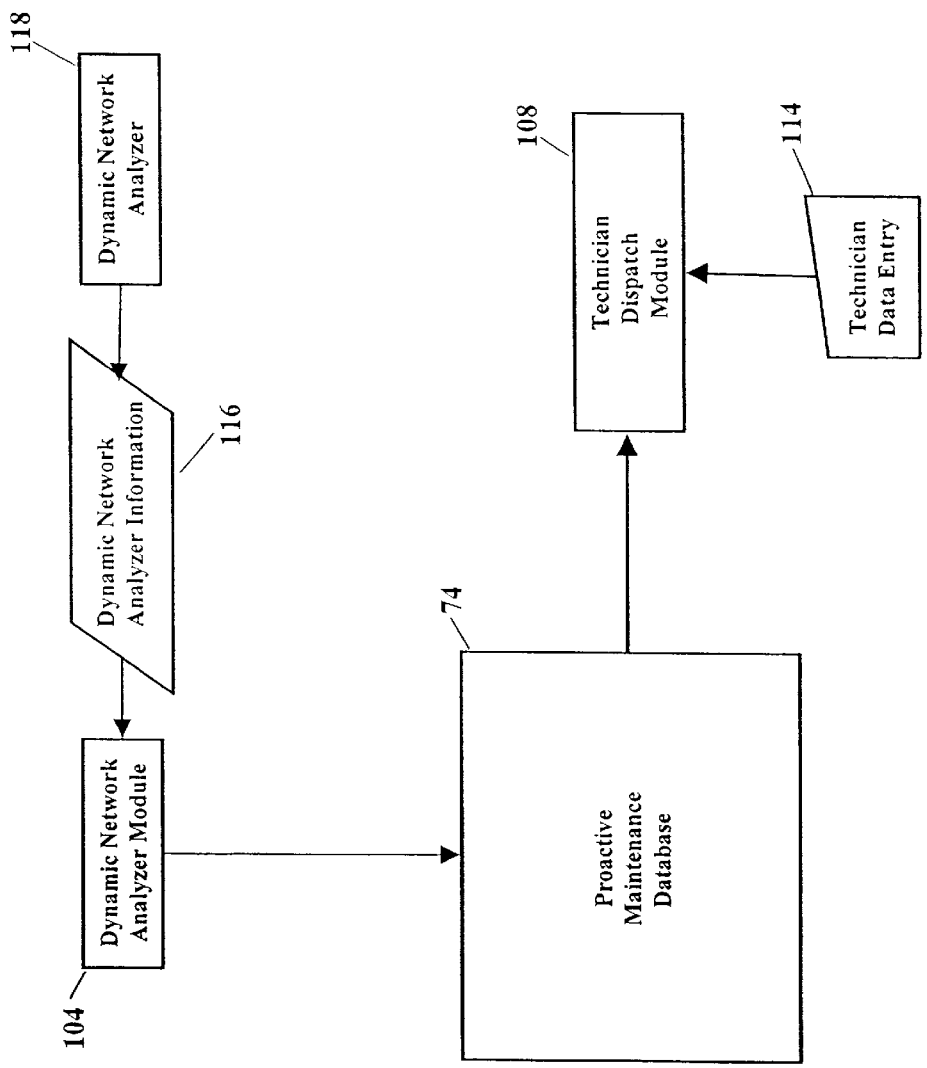
FIG. 6 is a block diagram of the Dynamic Network Analyzer Module 104 shown in FIG. 5.

FIG. 6 is a block diagram of the Dynamic Network Analyzer Module 104 shown in FIG. 5. The Dynamic Network Analyzer Module 104 provides historical information to the Proactive Maintenance Application Database 74. The Dynamic Network Analyzer Module 104 communicates with the communications network (shown as reference numeral 48 in FIG. 2) and acquires Dynamic Network Analyzer information 116 from a Dynamic Network Analyzer 118. The Dynamic Network Analyzer 118 is a software application that counts all customer trouble reports since a specific work order was issued or completed. These trouble reports, commonly referred to as Trouble Since Issued (TSI) reports, are utilized to re-prioritize open work orders on a daily basis. Each Trouble Since Issued report is associated with a particular feeder cable (shown as reference numeral 94 in FIGS. 4A and 4B) and a particular copper line pair within that feeder cable. The Dynamic Network Analyzer 118, for example, is typically run every week. The Dynamic Network Analyzer 118 generates a listing of what maintenance needs to be done based upon trouble history from customer trouble reports. The Dynamic Network Analyzer Module 104 communicates with the communications network and acquires the Dynamic Network Analyzer information 116 as an ASCII file. The Proactive Maintenance Application Database 74 acquires this ASCII file to create and prioritize maintenance work orders. The Proactive Maintenance Application Database 74 then interfaces with the Technician Dispatch Module 108 to generate and dispatch proactive maintenance work orders.

The Loop Facilities and Control System Module 106

Figure 7:
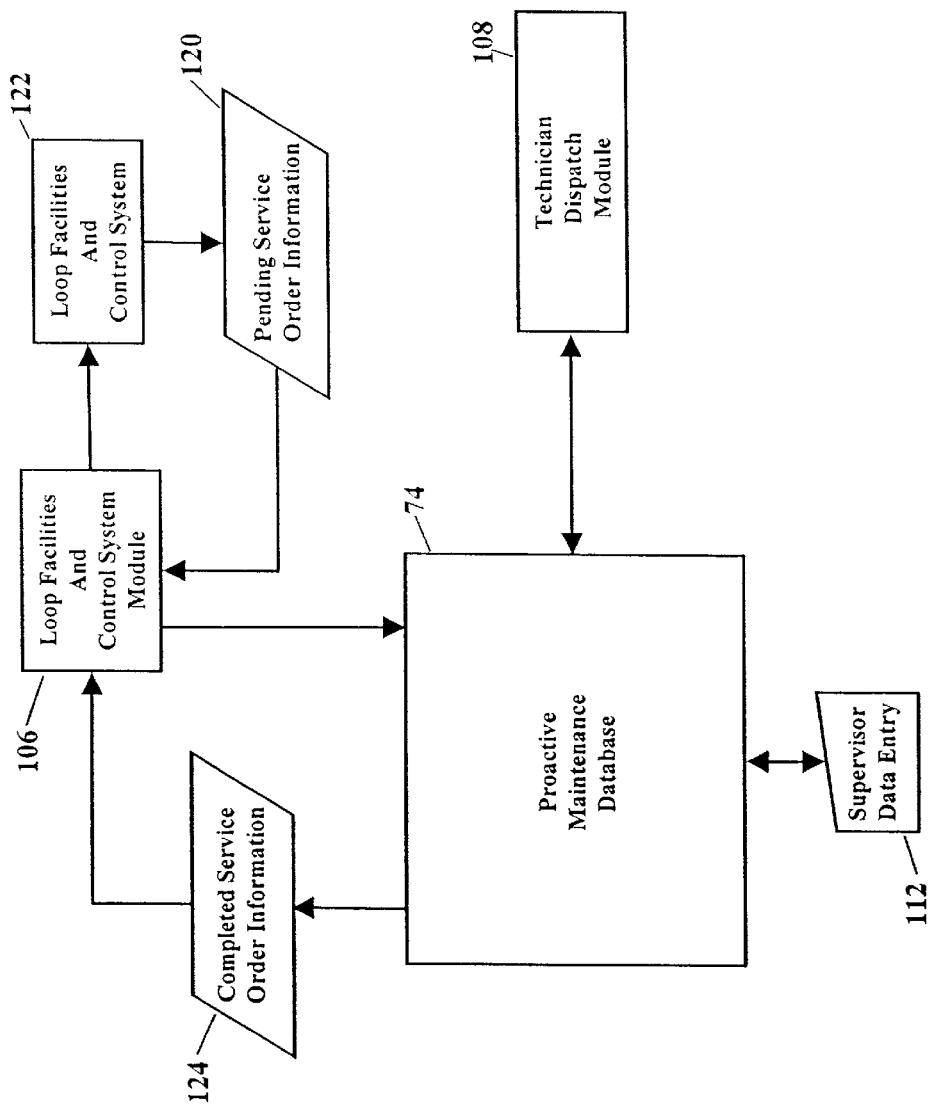
FIG. 7 is a block diagram of the Loop Facilities and Control System Module 106 shown in FIG. 5.

FIG. 7 is a block diagram of the Loop Facilities and Control System Module 106 shown in FIG. 5. The Loop Facilities and Control System Module 106 communicates with the communications network (shown as reference numeral 48 in FIG. 2) and acquires Pending Service Order Information 120 from a Loop Facilities and Control System 122. The Loop Facilities and Control System 122 maintains an engineering database of pending service orders. The Loop Facilities and Control System 122 provides the status of each copper line pair in a specified feeder cable (shown as reference numeral 94 in FIGS. 4A and 4B) associated with pending service orders. Pending service orders are conventionally written up manually and distributed from management down to the technician. This conventional distribution process is extremely slow, often requiring several weeks. The Loop Facilities and Control System Module 106, however, acquires the pending service order information 120 and merges the pending service order information 120 into a proactive maintenance work order. The Proactive Maintenance Application Database 74 then interfaces with the Technician Dispatch Module 108 to generate and dispatch proactive maintenance work orders. The field technician can complete both a proactive maintenance work order and a pending service order. The Proactive Maintenance Application 20 thus eliminates the manual paper trail and eliminates the very slow conventional process.

The Proactive Maintenance Application 20 also permits the technician supervisor to immediately update the Loop Facilities and Control System 122. Once the technician supervisor assigns a particular technician, the technician supervisor can email the pending service order information 120 directly to the field technician. The technician supervisor could alternatively generate the pending service order information 120 to the field technician's computer printer. The field technician receives the pending service order information 120, completes the service order, and returns the completed service order to the technician supervisor. The technician supervisor can then immediately log into the Proactive Maintenance Application 20 and manually update the system with the completed service order. This manually-entered supervisor data 112 is acquired by the Proactive Maintenance Application 20. The Proactive Maintenance Application 20 immediately communicates completed service order information 124 to the Loop Facilities and Control System Module 106. The Loop Facilities and Control System Module 106 communicates this completed service order information 124 to the Loop Facilities and Control System 122. The Loop Facilities and Control System 122 is immediately and automatically updated with any completed service orders.

The Proactive Maintenance Application 20 is a great improvement. Pending service orders with clear defective pairs were previously manually written and distributed from management down to the technician. Any pending service order could take weeks to funnel from central management down to the actual field technician. The Proactive Maintenance Application 20, however, compresses the time to complete a pending service order. The Proactive Maintenance Application 20 can now issue a pending service order in minutes. The Proactive Maintenance Application 20 also immediately and automatically updates the Loop Facilities and Control System 122 database of pending service orders. Thus whenever a pending service order is completed, the local telephone service provider knows within minutes that a copper line pair is available for use. The now-available copper line pair is ready to provide telephone service and to generate revenue for the local telephone service provider. The Proactive Maintenance Application 20, therefore, reduces service order response times, improves utilization of copper line pairs, and increases operational revenues.

Figure 8:
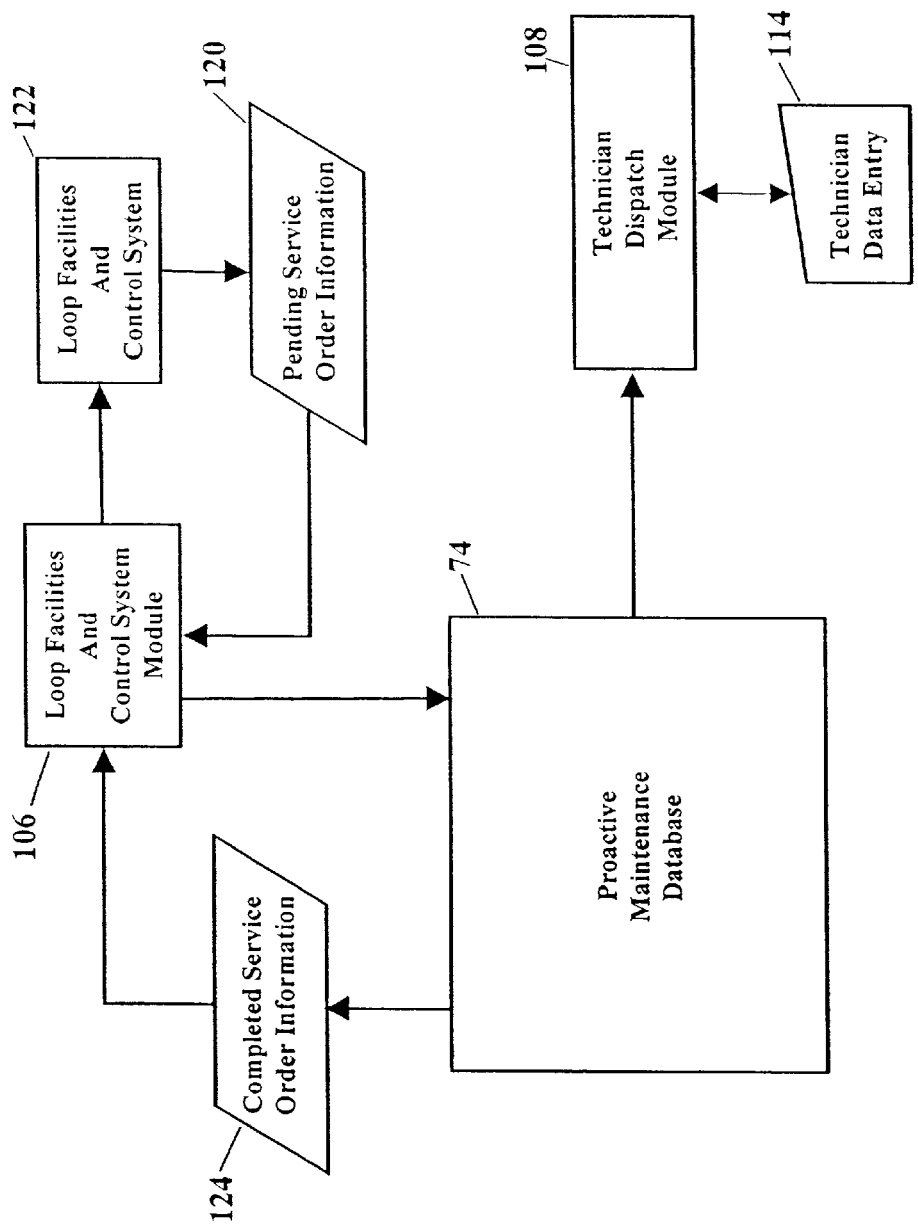
FIG. 8 is a functional block diagram of an alternate embodiment of the Loop Facilities and Control System Module 106 shown in FIG. 5.

FIG. 8 is a functional block diagram of an alternate embodiment of the Loop Facilities and Control System Module 106 shown in FIG. 5. This alternate embodiment allows the field technician to log onto into the Proactive Maintenance Application 20 and manually update the Proactive Maintenance Application 20 with a completed service order. This manually-entered technician data 114 is acquired by the Proactive Maintenance Application Database 74. The Proactive Maintenance Application Database 74 immediately passes the completed service order information 124 to the Loop Facilities and Control System Module 106. The Loop Facilities and Control System Module 106 sends this completed service order information 124 to the Loop Facilities and Control System 122. This embodiment allows the field technician to update the Loop Facilities and Control System 122 without supervisor effort.

The Technician Dispatch Module 108

Figure 9:
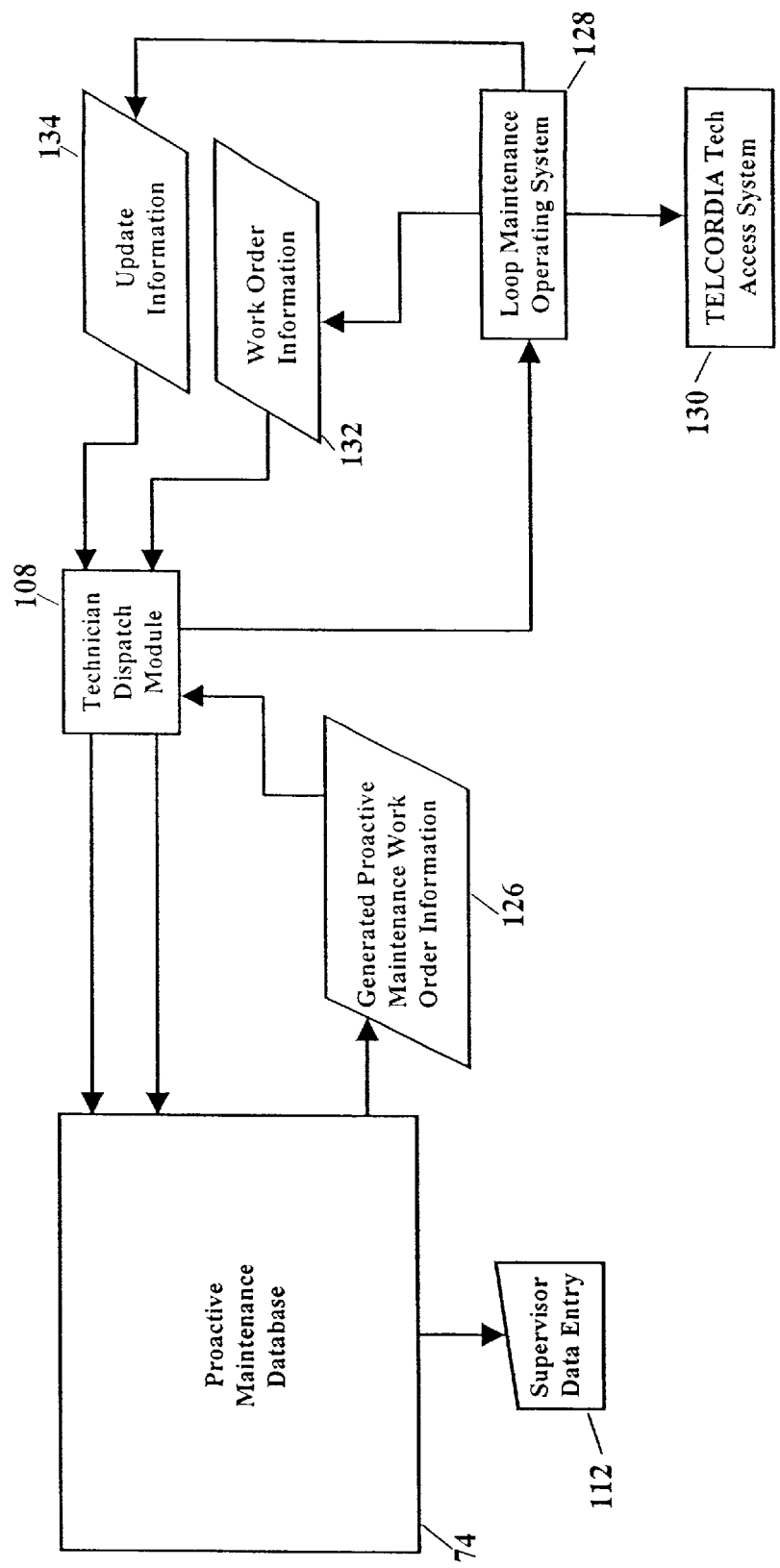
FIG. 9 is a functional block diagram of the Technician Dispatch Module 108 shown in FIG. 5.

FIG. 9 is a functional block diagram of the Technician Dispatch Module 108 shown in FIG. 5. The Technician Dispatch Module 108 not only dispatches proactive maintenance work orders, but the Technician Dispatch Module 108 also tracks field technician proficiencies. Once the Proactive Maintenance Application 20 generates a proactive maintenance work order, the Technician Dispatch Module 108 acquires generated proactive maintenance work order information 126 representing the generated proactive maintenance work order. The Technician Dispatch Module 108 communicates the generated proactive maintenance work order information 126 to a Loop Maintenance Operating System 128. The Loop Maintenance Operating System 128 communicates the generated proactive maintenance work order information 126 to a Tech Access System 130. The Tech Access System 130 is one component of the TELCORDIA™ Work and Force Management Suite of products (TELCORDIA™ is a trademark claimed by Telcordia Technologies, Inc., 445 South St., Morristown, N.J. 07960 USA, www.telcordia.com). The Tech Access System 130 dispatches a work order describing the generated proactive maintenance work order information 126. The Technician Dispatch Module 108, in turn, retrieves and communicates work order information 132 from the Loop Maintenance Operating System 128 to the Proactive Maintenance Application Database 74, with the work order information 132 representing a work order ticket number. The Technician Dispatch Module 108 may also retrieve and communicate hourly update information 134 from the Loop Maintenance Operating System 128 to the Proactive Maintenance Application Database 74. The hourly update information 134 represents the status of each work order ticket number.

Figure 10:
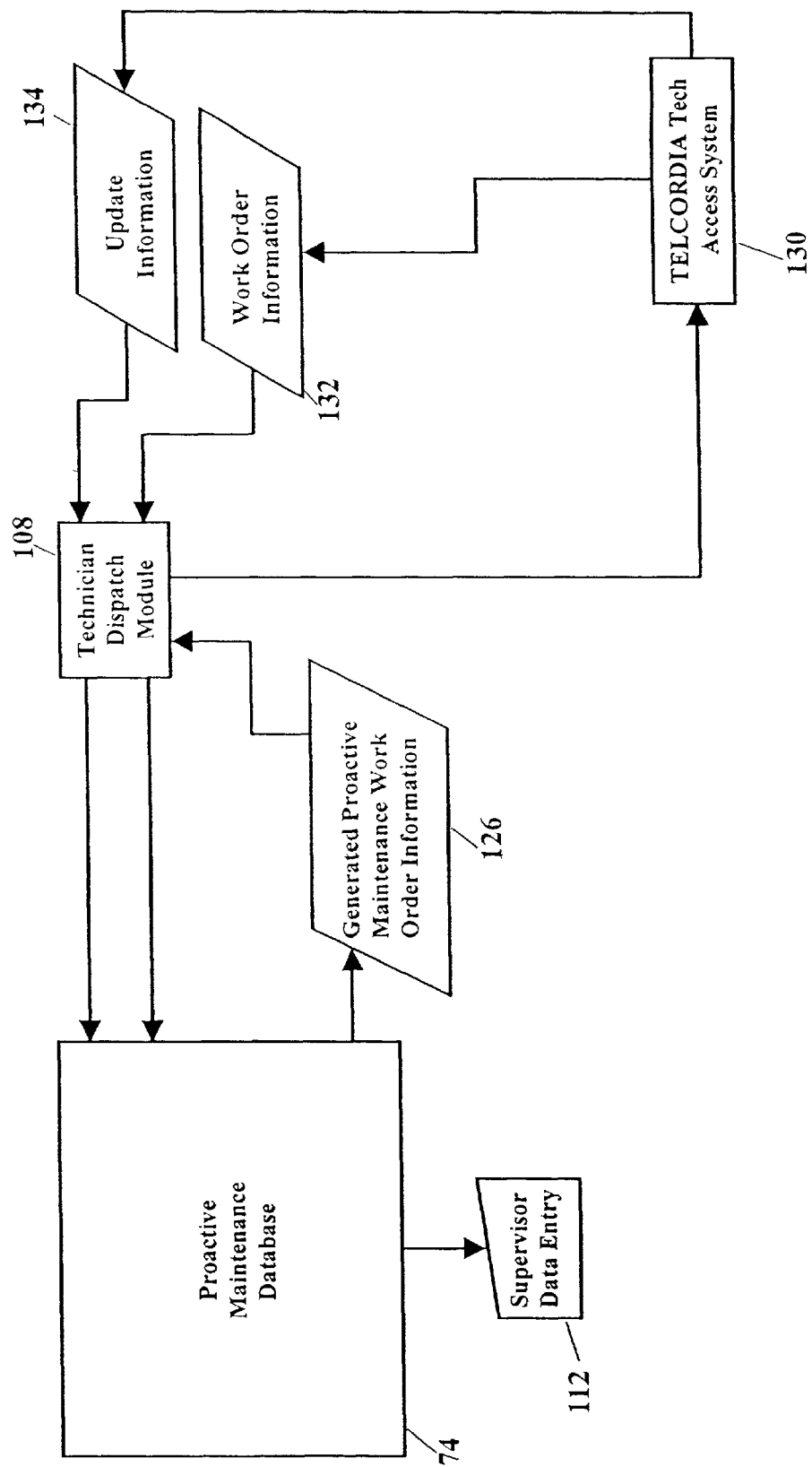
FIG. 10 is a functional block diagram of an alternate embodiment of the Technician Dispatch Module 108 shown in FIG. 5.

FIG. 10 is a functional block diagram of an alternative embodiment of the Technician Dispatch Module 108 shown in FIG. 5. This alternative embodiment allows the Technician Dispatch Module 108 to directly interface with the Tech Access System 130. The Technician Dispatch Module 108 communicates the generated proactive maintenance work order information 126 to the Tech Access System 130. The Tech Access System 130 dispatches a work order describing the generated proactive maintenance work order information 126. The Technician Dispatch Module 108, in turn, retrieves and communicates the work order information 132 to the Proactive Maintenance Application Database 74. The Tech Access System 130 also communicates the hourly update information 134 on the status of each work order ticket number.

The Pressure Alarms and Reports System Module 110

Figure 11:
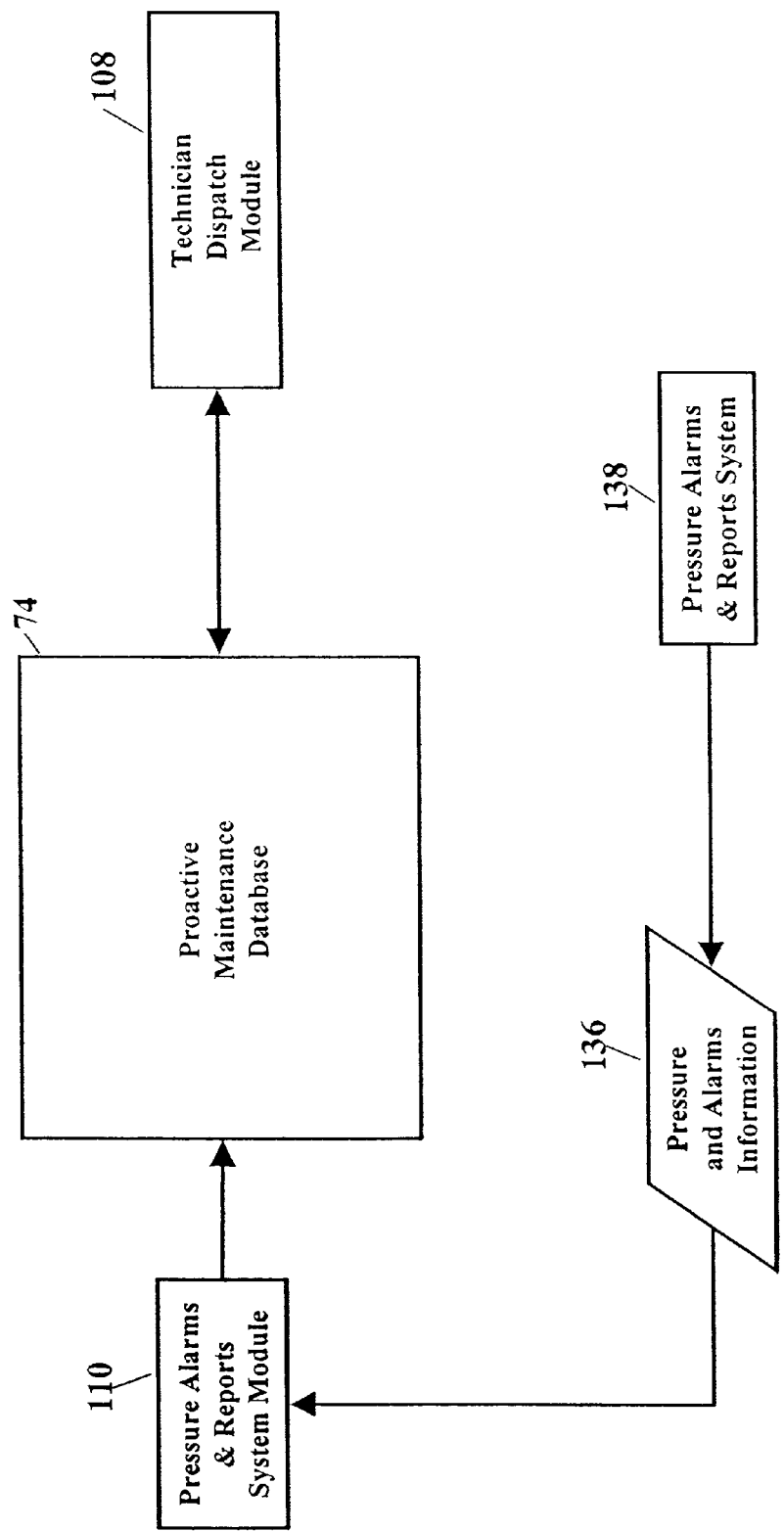
FIG. 11 is a block diagram of the Air Pressure Alarms and Reports System Module 110 shown in FIG. 5.

FIG. 11 is a block diagram of the Pressure Alarms and Reports System Module 110 shown in FIG. 5. The Pressure Alarms and Reports System Module 110 communicates with the communications network (shown as reference numeral 48 in FIG. 2) and acquires pressure and alarm information 136 from a Pressure Alarms and Reports System 138. This pressure and alarm information 136 indicates the status of flow sensors and pressure sensors monitoring fiber optic cables. The Pressure Alarms and Reports System Module 110 allows the Proactive Maintenance Application to acquire this pressure and alarm information 136 from a computer monitoring the Pressure Alarms and Reports System 138. The Proactive Maintenance Application uses this pressure and alarm information 136 to predict and to prioritize proactive maintenance work orders. The Proactive Maintenance Application then interfaces with the Technician Dispatch Module 108 to generate and dispatch proactive maintenance work orders.

Figure 12:
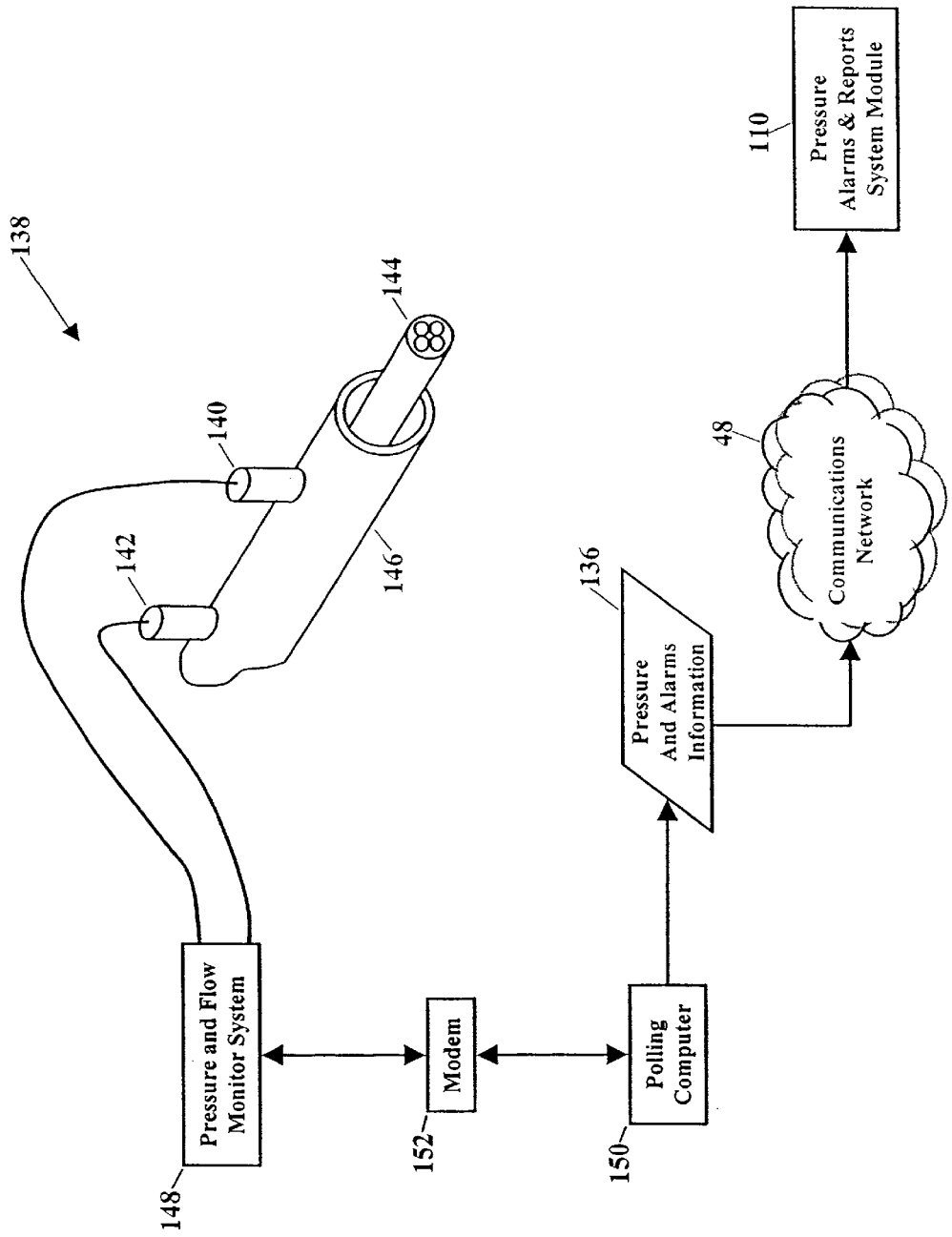
FIG. 12 is a schematic representation of the Air Pressure Alarms and Reports System 138 shown in FIG. 11.

FIG. 12 is a schematic representation of the Pressure Alarms and Reports System 138. The Pressure Alarms and Reports System 138 monitors and analyzes flow and pressure sensors along fiber optic cables. As FIG. 12 shows, at least one flow transducer sensor 140 and at least one pressure transducer sensor 142 indicates flow and pressure along a bundle 144 of fiber optic cables. The bundle 144 of fiber optic cables may be routed within a conduit 146 (only a small, representative portion of the conduit 146 is shown). The flow transducer sensor 140 and the pressure transducer sensor 142 indicates flow and pressure within the conduit 146. As those of ordinary skill in the art understand, a change in pressure or flow within the conduit the conduit 146 may be hundreds of feet in length, so there may be many sensors along the conduit 146. A pressure and flow monitor system 148 provides automated surveillance of output signals from the flow transducer sensor 140 and the pressure transducer sensor 142. A polling computer 150 communicates through a modem 152 with the pressure and flow monitor system 148. The polling computer 150 polls the pressure and flow monitor system 148 and receives notification of pressure drops, flow changes, and alarms. The Pressure Alarms and Reports System Module 110 communicates with the communications network 48 and acquires the pressure and alarm information 136 from the polling computer 150.

The pressure and alarm information 136 may indicate many operating and status parameters. The pressure and alarm information 136 may include at least one of i) pressure information associated with fiber optic cables and ii) flow information associated with fiber optic cables. The pressure and alarm information 136 may be associated with pressure, flow, pressure alarms, or flow alarms. The pressure and alarm information 136 may indicate the operating status of a particular sensor or the operating status of a series of sensors. The pressure and alarm information 136 may be ranked or sorted by state, district, wire center, and/or work group. The pressure and alarm information 136 may be sorted by a particular Digital Subscriber Line. The pressure and alarm information 136 may be prioritized by state, district, wire center, and/or work group. The pressure and alarm information 136 may even indicate a historical log of sensor readings, with each reading time and date stamped. The pressure and alarm information 136 may indicate the total number of sensors in a particular location, and the percentage of sensors in an alarm mode or the percentage of sensors not working. The pressure and alarm information 136 may also indicate sensor calibration data. As those of ordinary skill in the art understand, the pressure and alarm information 136 may represent any information pertaining to the flow transducer sensors 140, the pressure transducer sensors 142, and the pressure and flow monitor system 148.

The Pressure Alarms and Reports System 138 can be further described. The flow transducer sensors 140, the pressure transducer sensors 142, and the pressure and flow monitor system 148 are commercially available from Sparton Technology, Inc. (2400 East Ganson Street, Jackson, Mich. 49202, (517) 787-8600, www.sparton.com). The flow monitor system 148 is Sparton Technology's Model 535300B. The polling computer 150 is a Compaq Proliant 2000 server (Compaq Computer Corporation, 20555 SH 249, P.O. Box 692000, Houston, Tx. 77269-2000, (281) 370-0670, www.compaq.com). The flow transducer sensor 140 and the pressure transducer sensor 142 may indicate the flow and pressure of any fluid. The term "fluid," as used in this patent, means any liquid, gas, or semisolid gel. The flow transducer sensor 140 and the pressure transducer sensor 142, therefore, may indicate the flow and pressure of air, nitrogen, oil, water, silicone, petroleum gel, or any other fluid.

EXAMPLE

Figure 13:
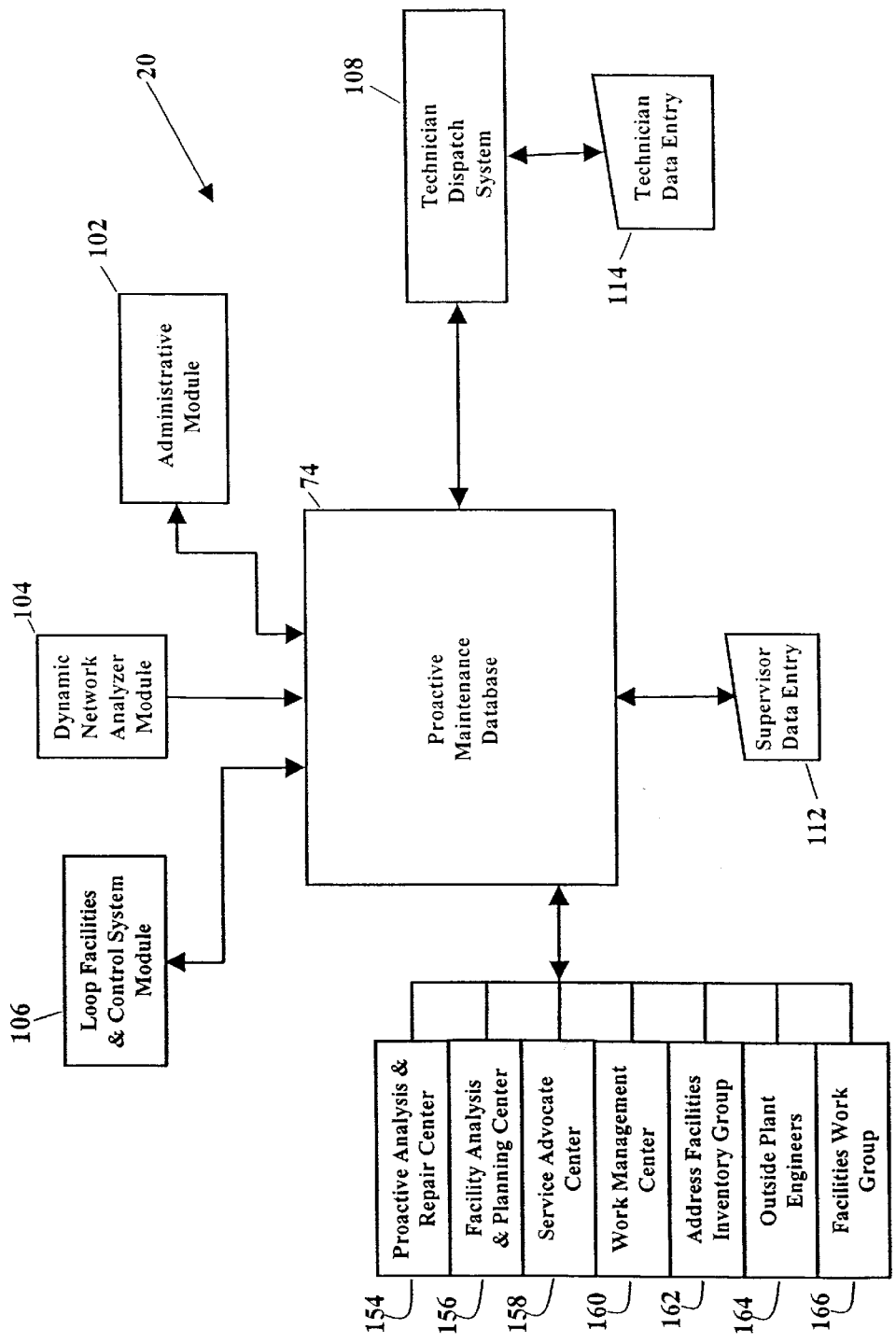
FIG. 13 is a block diagram showing a non-limiting example configured for proactively maintaining the local loop.

The Proactive Maintenance Application 20 is further illustrated by the following non-limiting example. FIG. 13 is a block diagram showing this particular non-limiting example is further configured for proactively maintaining the local loop (shown as reference numeral 78 in FIG. 4A). This non-limiting example is similar to that shown in FIG. 5, however, this example allows the Proactive Maintenance Application Database 74 to be accessed by several user groups. These user groups include a Proactive Analysis and Repair Center 154, a Facilities Analysis and Planning Center 156, a Service Advocate Center 158, a Work Management Center 160, an Address Facilities Inventory Group 162, Outside Plant Engineers 164, and a Facilities Work Group 166. These user groups have authority to access some or all information stored in the Proactive Maintenance Application Database 74. Some user groups may even have authority to alter information stored in the Proactive Maintenance Application Database 74. The Proactive Analysis and Repair Center 154, for example, has authority to alter the Dynamic Network Analyzer information 116 (shown as reference numeral 116 in FIG. 6). The Facilities Analysis and Planning Center 156, likewise, has authority to assign in bulk any repairs to copper line pairs. The Systems Administrator may authorize as many groups as desired to access and even alter information stored in the Proactive Maintenance Application 20. The Proactive Maintenance Application 20 thus allows dedicated groups to monitor corporate-wide proactive maintenance. This corporate-wide monitoring ensures the local loop is proactively and uniformly maintained in all states and regions.

Once information is acquired and stored in the Proactive Maintenance Application Database 74, the Proactive Maintenance Application 20 prioritizes proactive maintenance procedures. The Proactive Maintenance Application 20 uses weighted formulas to prioritize proactive maintenance work orders. The weighted formulas predict proactive maintenance for Predictor indications, copper line pair changes, predict proactive maintenance for Dynamic Network Analyzer work orders, and predict proactive maintenance bulk copper line pair recovery. The following paragraphs describe each formula and its associated terms.

A weighted formula for predicting proactive maintenance using Predictor trends is first described. As those of ordinary skill recognize, Predictor is a computer program that collects nightly switch information. A Predictor module communicates with the communications network and acquires this nightly switch information. The Proactive Maintenance Application uses this nightly switch information to predict proactive maintenance based upon the Predictor trends. The nightly switch information may also be used by the Dynamic Network Analyzer module to predict proactive maintenance and to indicate TSI's since a work order was created and dispatched. The formula $$\frac{W_1(FEF0) + W_2(FEF1) + W_3(\text{number of defective line pairs}) + W_4(FEF0SI) + W_5(FEF1SI)}{\text{Time per task for Predictor packages}}$$

has both weighting variables and terms. The weighting variables are $W_1$, $W_2$, $W_3$, $W_4$, and $W_5$, while the terms are FEF0, FEF1, FEF0SI, and FEF1SI. The terms "number of defective line pairs" and "Time per task for Predictor packages" are self-evident to those of ordinary skill and will not be further described. The weighting variables will be later shown and described in a table.

As those of ordinary skill recognize, the terms are common telephony disposition codes. FEF0, for example, indicates a foreign electromotive force was found on the customer's line. A foreign electromotive force may be discovered during a mechanized loop test. FEF1 indicates a battery is present on the F1 facility or the facilities leaving the central office. FEF0SI indicates a foreign electromotive force since a work order was issued. FEF1SI, likewise, indicates a battery is present since a work order was issued.

A weighted formula for predicting copper line pair changes is next described. The formula is $$\frac{A + B}{\text{Time per task for a pair change}}$$

where $A = W_6(\text{Code 4}) + W_7(\text{Code 7}) + W_8(\text{Code 9}) + W_9(\text{Predictor})$ and $B = W_{10}(\text{number of defective line pairs}) + W_{11}(\text{TSI4}) + W_{12}(\text{TSI7}) + W_{13}(\text{TSI9})$.

The formula, as above, has both weighting variables and terms. The weighting variables are $W_6$, $W_7$, $W_8$, $W_{11}$, $W_{12}$, and $W_{13}$, while the terms are Code 4, Code 7, Code 9, TSI4, TSI7, a The terms "number of defective line pairs" and "time per task for a pair change" are self-evident to those of ordinary skill and will not be further described. The weighting variables will be later shown and described in a table.

The terms, again, are common telephony disposition codes. Code 4 applies to all troubles found in cables, cable terminals, amplifiers, line wire, load coils and protection, field-located amplifiers, field-located carrier equipment, and field-located loop electronics. Code 4 also includes trouble reports resulting from a failure of the outside local loop equipment. Code 7 applies to those trouble reports that are tested and verified without dispatching a field technician. Code 7 indicates a trouble report was tested/retested and verified as corrected, either manually or mechanically, so no dispatch is required. Code 7 would include customers who verify their equipment is properly working before a mechanical or manual test is conducted. Code 9 applies when a dispatched field technician cannot locate a root cause of the trouble. Code 9 includes trouble reports referred first to central office forces, but subsequently, dispatched to outside forces.

As those of ordinary skill also understand, the TSI terms indicate Trouble Since Issued (hence "TSI") dispositions. The Trouble Since Issued dispositions (as previously explained with reference to FIG. 6) applies to trouble received after the proactive maintenance work orders have been developed, but, not dispatched. TSI4, for example, indicates Code 4 trouble was received after the proactive maintenance work order was predicted. TSI7 and TSI9, similarly, indicate Code 7 trouble or Code 9 trouble, respectively, was received.

A weighted formula for predicting Dynamic Network Analyzer proactive maintenance is next described. The formula is $$\frac{C+D}{\text{Time per task for Dynamic Network Analyzer work order}}$$

where $C=W_{14}(\text{Code }4)+W_{15}(\text{Code }7)+W_{16}(\text{Code }9)+W_{17}(\text{Predictor})$ and $D=W_{18}(\text{number of defective line pairs})+W_{19}(\text{TSI4})+W_{20}(\text{TSI7})+W_{21}(\text{TSI9})$.

The terms Code 4, Code 7, Code 9, TSI4, TSI7, and TSI9 are the same as described above. The terms "number of defective line pairs" and "time per task for Dynamic Network Analyzer work order" are self-evident to those of ordinary skill and will not be further described. The weighting variables will be later shown and described in a table.

A weighted formula for predicting bulk copper line pair recovery is next described. The formula is $$\frac{W_{22}(\text{growth})(\text{number of defective line pairs})}{(\text{number of spare line pairs})} \cdot$$

$$(\text{time per task for bulk pair recovery})$$

The term "growth" is the increase in loop activity created by requests for new service and for new customers. The terms "number of defective line pairs," "number of spare line pairs," and "time per task for bulk pair recovery" are again self-evident to those of ordinary skill and will not be further described. The weighting variables are shown and described below.

The weighting variables are chosen based upon field experience. As those of ordinary skill recognize, the weighting variables are used to adjust predicted results. The predicted results are compared with actual field results. The weighting variables are then adjusted until the predicted results closely approximate actual field results. As those of ordinary skill also recognize, the weighting variables may be continually refined to improve predicted work order results. The table below shows the values of the weighting variables used in the non-limiting example. These weighting variables were selected based upon the actual results of 170 predicted work orders.

| Weighting Variable | Value | Weighting Variable | Value |
| --- | --- | --- | --- |
| $W_1$ | 0.89 | $W_{12}$ | 0.24 |
| $W_2$ | 0.50 | $W_{13}$ | 0.24 |
| $W_3$ | 5.90 | $W_{14}$ | 0.18 |
| $W_4$ | 0.89 | $W_{15}$ | 0.18 |
| $W_5$ | 0.50 | $W_{16}$ | 0.45 |
| $W_6$ | 0.24 | $W_{17}$ | 13.4 |
| $W_7$ | 0.24 | $W_{18}$ | 0.18 |
| $W_8$ | 0.24 | $W_{19}$ | 0.90 |
| $W_9$ | 9.20 | $W_{20}$ | 0.18 |
| $W_{10}$ | 1.60 | $W_{21}$ | 0.45 |
| $W_{11}$ | 0.54 | $W_{22}$ | 0.08 |

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for proactively maintaining a telephone system local loop, the method comprising:
    communicating with a communications network and acquiring at least one of pressure information associated with a fiber optic cable and flow information associated with the fiber optic cable;
    predicting and prioritizing proactive maintenance of the fiber optic cable using changes in the acquired pressure and flow information;
    merging a pending service order information into the predicted and prioritized proactive maintenance;
    generating and dispatching work order information describing the predicted and prioritized proactive maintenance and the merged pending service order information; and
    receiving a progress update for the work order information from the communications network through a common repository of the work order information which is accessed by a user, wherein the user is authorized to access the common repository.

2. A method for proactively maintaining a telephone system local loop according to claim 1, further comprising predicting proactive maintenance of a telephone line using information from a Dynamic Network Analyzer.

3. A method for proactively maintaining a telephone system local loop according to claim 2, wherein the work order information describes the predicted and prioritized proactive maintenance of the fiber optic cable, the merged pending service order information and the predicted proactive maintenance of the telephone line.

4. A method for proactively maintaining a telephone system local loop according to claim 1, further comprising predicting proactive maintenance of a telephone line using information from a Loop Facilities and Control System.

5. A method for proactively maintaining a telephone system local loop according to claim 4, wherein the work order information describes the predicted and prioritized proactive maintenance of the fiber optic cable, the merged pending service order information and the predicted proactive maintenance of the telephone line.

6. A method for proactively maintaining a telephone system local loop according to claim 1, wherein generating and dispatching work order information comprises interfacing with a technician dispatch system to dispatch the work order information describing the predicted and prioritized proactive maintenance and the merged pending service order information.

7. A method for proactively maintaining a telephone system local loop according to claim 1, wherein generating and dispatching work order information comprises interfacing with a TELCORDIA Tech Access System to dispatch the work order information describing the predicted and prioritized proactive information and the merged pending service order information.

8. A method for proactively maintaining a telephone system local loop according to claim 1, wherein generating and dispatching work order information comprises interfacing with a Loop Maintenance Operating System to dispatch the work order information describing the predicted and prioritized proactive maintenance and the merged pending service order information.

9. A system configured for predicting proactive maintenance of a telephone system local loop, the system comprising:

a Pressure Alarms and Reports System Module communicating with a communications network and acquiring at least one of pressure information associated with a fiber optic cable and flow information associated with the fiber optic cable;

a database stored in memory, the database storing the acquired information;

a processor capable of processing information stored in the database and of generating predicted and prioritized proactive maintenance by using changes in the acquired press and flow information, the predicted and prioritized proactive maintenance being merged with a pending service order information to generate work order information; and a common repository of the work order information which is accessed by a user, wherein the user is authorized to access the common repository, wherein the processor updates the generated work order information in response to new user information inputted by the user.

10. A system for predicting proactive maintenance according to claim 9, further comprising a Dynamic Network Analyzer module, the Dynamic Network Analyzer module communicating with the communications network and acquiring information associated with a Dynamic Network Analyzer.

11. A system for predicting proactive maintenance according to claim 9, further comprising a Loop Facilities and Control System module, the Loop Facilities and Control System module communicating with the communications network and acquiring information associated with a Loop Facilities and Control system.

12. A computer program product for proactively maintaining a telephone system, comprising:

a computer-readable medium;

a Pressure Alarms and Reports System Module stored on the medium, the Pressure Alarms and Reports System module coupled to a monitoring system over a communications network, the Pressure Alarms and Reports System module acquiring at least one of information associated with a pressure sensor along a fiber optic cable and information associated with a flow sensor along the fiber optic cable;

a Dynamic Network Analyzer module stored on the medium, the Dynamic Network Analyzer module coupled to a Dynamic Network Analyzer over the communications network, the Dynamic Network Analyzer module acquiring information associated with the Dynamic Network Analyzer and providing historical information; and a Loop Facilities and Control System module stored on the medium, the Loop Facilities and Control System module coupled to a Loop Facilities and Control System over the communications network, the Loop Facilities and Control System module acquiring and updating information associated with the Loop Facilities and Control system, wherein the acquired information from the Pressure Alarms and Reports System module, the Dynamic Network Analyzer module and the Loop Facilities and Control System module is used to predict and prioritize proactive maintenance; and wherein the predicted and prioritized proactive maintenance is merged with a pending service order information to generate work order information, and the work order information is updated through a common repository of the work order information which is accessed by a user, wherein the user is authorized to access the common repository.

13. A method for proactively maintaining a telephone system local loop according to claim 1, further comprising providing historical work order information based on all the generated work order information.

* * * * *